United States Patent [19]

Blackmore

[11] Patent Number: 4,807,349

[45] Date of Patent: Feb. 28, 1989

[54] FASTENER REMOVING METHOD

[75] Inventor: B. Brian Blackmore, Arnprior, Canada

[73] Assignee: The Boeing Company, Seattle, Wash.

[21] Appl. No.: 66,433

[22] Filed: Jun. 26, 1987

[51] Int. Cl.[4] .......... B23P 19/00

[52] U.S. Cl. .......... 29/426.5; 29/DIG. 46; 29/525.1; 81/463

[58] Field of Search .......... 29/426.5, DIG. 46, 426.6, 29/446, 526 R; 81/463–466

[56] References Cited

U.S. PATENT DOCUMENTS

| | | | |
|---|---|---|---|
| 1,761,156 | 6/1930 | Rosan | 81/463 |
| 2,543,441 | 2/1951 | Crummey | 81/463 X |
| 2,948,059 | 8/1960 | Bodine, Jr. | 29/426.5 |
| 3,142,899 | 8/1964 | Meyer | 29/426.5 X |
| 3,422,910 | 1/1969 | Von Nostrand, Jr. | 81/463 |
| 3,650,016 | 3/1972 | McMaster | 81/463 X |
| 3,861,250 | 1/1975 | Zugai | 81/464 |
| 3,890,697 | 6/1975 | Horioka | 29/DIG. 46 X |
| 4,095,325 | 6/1978 | Hashimoto et al. | 29/446 X |

FOREIGN PATENT DOCUMENTS 730418 5/1932 France .

*Primary Examiner*—Charlie T. Moon

*Attorney, Agent, or Firm*—Conrad O. Gardner; B. A. Donahue

[57] ABSTRACT

A method and apparatus for removing frozen, stuck or sealant anchored fasteners from aircraft assemblies that cannot be unscrewed by conventional screwdrivers. A pulsating force is applied through the longitudinal axis of the apparatus to the head of the fastener while simultaneously torquing the fastener alternately and sequentially in counterclockwise and clockwise directions until resistance to the removal of the fastener has been reduced to permit removal by conventional screwdriver.

2 Claims, 2 Drawing Sheets

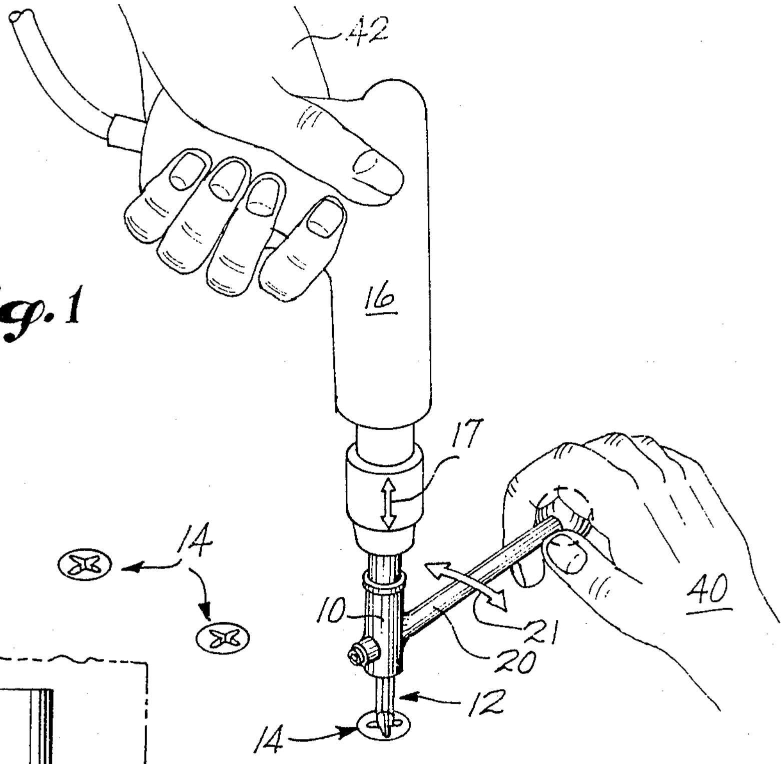
Fig. 1
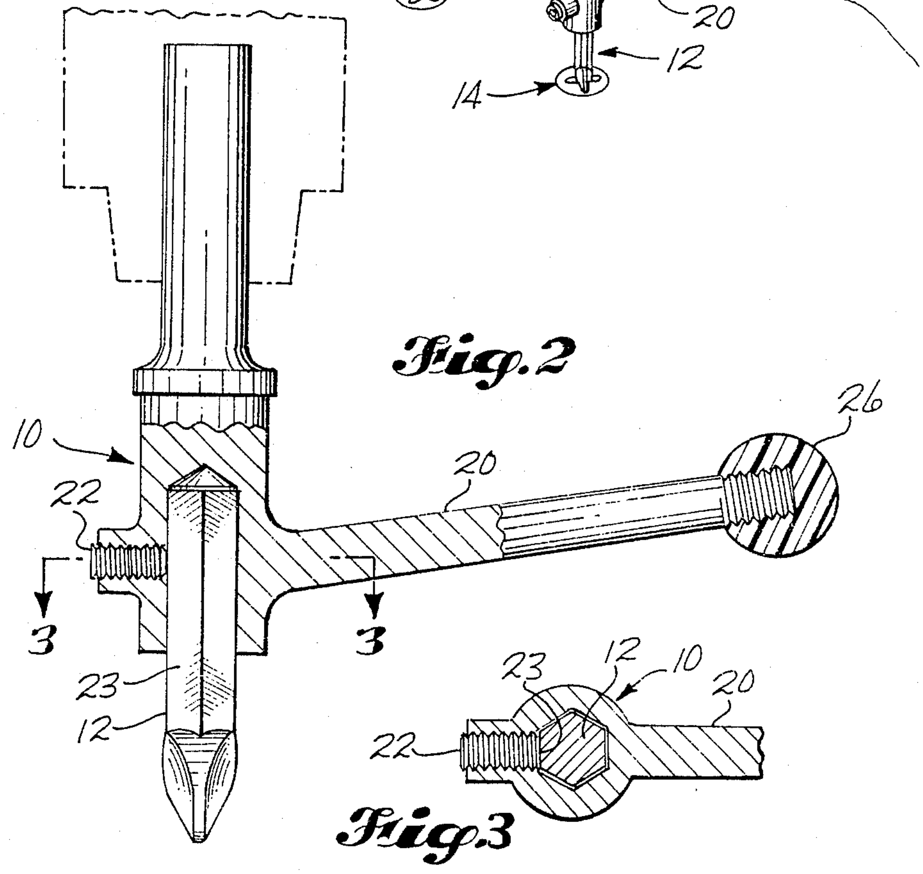
Fig. 2
Fig 3

FASTENER REMOVING METHOD

BACKGROUND OF THE INVENTION

This invention relates to a fastener removing method and apparatus for removing frozen, stuck or sealant anchored fasteners from aircraft assemblies.

Heretofore frozen, stuck or sealant anchored fasteners having recessed heads such as the so-called Phillips, Reed and Prince screws when sought to be removed by employing ordinary screwdrivers has resulted in gouging, mutilating and damaging the driver slot. Hitting the screw with a hard object to loosen the screw has met with only limited success and in any event was time consuming. Hammering or drilling operations on screws in order to remove them can cause damage and effect parts surrounding the screw.

A tapping and quick reverse tool is shown in French Patent No. 730,418. U.S. Pat. No. 3,422,910 shows apparatus for impacting and torquing a bolt. U.S. Pat. No. 3,861,250 shows vibration forces per se utilized in loosening a frozen workpiece such as a nut or bolt.

In contrast with the previous methods and techniques for removing frozen, stuck or sealant anchored fasteners, the present method for removing fasteners involves the utilization of a pulsating force applied along the longitudinal axis of the screw extracting tool to the head of the fastener while simultaneously torquing the fastener alternately and sequentially in counterclockwise and clockwise directions about its central axis until the resistance to removal due to the stuck condition has been reduced to permit removal of the screw by conventional screwdriver.

BRIEF DESCRIPTION OF THE DRAWINGS

The several objects and advantages of the present invention will become apparent from the following description and drawings in which:

FIG. 1 is a perspective view of a preferred embodiment of the present fastener removing apparatus showing screw extracting tool removing a Phillips head screw which utilizes a pulsating force applied by a rivet gun and ultimate torquing of the screw in a plane parallel to the axis of the screw by hand of the operator;

FIG. 2 is a side view taken in section of the apparatus of FIG. 1;

FIG. 3 is a section taken along the lines 3—3 of FIG. 2;

DESCRIPTION OF THE PREFERRED EMBODIMENTS

Figure 4:
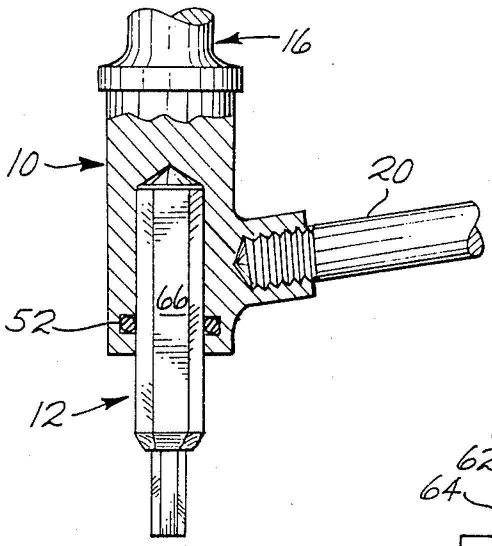
FIG. 4 is a partial side view of a further embodiment of the screw removing tool of FIGS. 1 through 3 however utilizing an Allen head-type screwdriver attachment instead of a Phillips head screwdriver attachment.

Turning now to FIG. 1, it can be seen that screw extracting tool 10 receives a screwdriver attachment 12 (for Phillips head screws) which is utilized to unscrew a plurality of frozen Phillips head screws 14 from a panel structure (not shown). The other end of screw extracting tool 10 is adapted to receive pulsating forces 17 from a rivet gun 16. Screw extracting tool 10 includes a handle portion 20 extending at right angles to the central axis of screw extracting tool 10 which handle 20 is rotated alternately and sequentially in counterclockwise and clockwise directions in a plane perpendicular to the central axis of screw extracting tool 10 in order to transmit torsional forces through screwdriver attachment 12 to Phillips head screws 14. Upon the loosening of Phillips head screws 14, they may be removed in normal manner manually by utilization of a screwdriver. Fasteners such as Phillips head screws 14 have a hardness on the Rockwell C Scale of less than 40 while screwdriver attachment 12 has a hardness on the Rockwell C scale above 40, e.g. 40–46. The apparatus of FIG. 1 enables removal of screws in panels without damaging the part or stripping of the screws when utilized in accordance with the method steps hereinbefore described. The simultaneous application of a pulsating force through the longitudinal axis of screw removing tool 10 to the head of the fastener and torquing of the fastener alternately and sequentially in counterclockwise and clockwise directions 21 results in the achievement of a task which is cost saving, part saving and time saving.

Turning now to FIGS. 2 and 3, it can be seen that locking means for securing the shank portion of screwdriver attachments 12 can comprise screw means 22 extending radially (see FIG. 3) through extracting tool 3 against a flat surface 23 of the shank portion of screw extracting tool 10. Handle 20 may include as seen in FIG. 2 a non-slipping gripping end portion 26 for use by the right hand of a right-handed operator. As seen in FIG. 1 a hammer impact tool for providing a pulsating force which is transmitted to the longitudinal axis of the screw can be provided by the rivet gun 16 shown in the left hand 42 of a right-handed operator.

Figure 5:
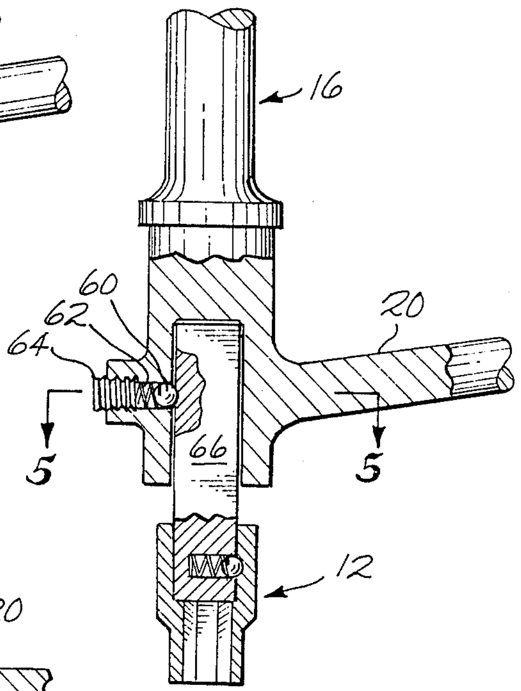
FIG. 5 is a partial side view cutout of the apparatus of FIG. 4 showing in more detail the means for retaining the Allen head-type screwdriver attachment within the screw removing tool; and, FIG. 6 is a section taken along the lines 6—6 of FIG. 5 showing in more detail the socket detent ball spring configuration for retaining the screwdriver attachment of FIG. 5 within the screw extracting tool of FIG. 5.
Figure 6:
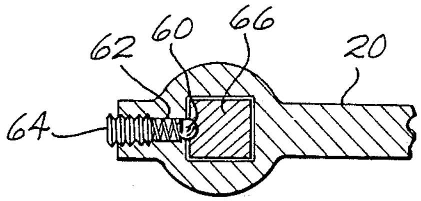

Turning now to FIG. 4 it can be seen that coaxially disposed "O" ring 52 may be utilized to secure screwdriver attachment 12 within the end portion of screw extracting tool 10. As shown in FIGS. 5 and 6 a further means for securing screw extracting tool 12 can comprise a ball, spring and screw-detent arrangement extending into the upper shank portion 66 of screwdriver attachment 12.

It may be desirable to provide a unitary structure comprising screw extracting tool 10 and screwdriver attachment 12 in instances where removal and substitution of different types of screwdriver blade configurations is unnecessary.

While several embodiments of the present invention have been shown and described, the invention is defined within the scope of the following claims.

What is claimed is:

1. A method of dislodging and unscrewing a screw from a workpiece comprising the steps of:

entering the blade end of a screwdriver attachment into the screwdriver slot in the head of said screw;

applying a pulsating force through a screw extracting tool and said blade end of said screwdriver attachment to the head of said screw;

simultaneously applying a further torquing force alternately and sequentially in counterclockwise and clockwise directions about the central axis of said screw; and, wherein simultaneously applying said further torquing force alternately and sequentially in counterclockwise and clockwise directions about the central axis of said screw comprises rotating a handle of said screw extracting tool alternately and sequentially in counterclockwise and clockwise directions about the central axis of said screw extracting tool.

2. The method according to claim 1 wherein said pulsating force is applied at a frequency exceeding the frequency of application of said further torquing force.

* * * * *